United States Patent [19]
McNabb et al.

[11] Patent Number: 5,980,601
[45] Date of Patent: Nov. 9, 1999

[54] ANTI-CAKING SOLIDS

[75] Inventors: Andrew J. McNabb; R. Merritt Sink, both of Lake Jackson, Tex.

[73] Assignee: BASF Corporation, Mt. Olive, N.J.

[21] Appl. No.: 08/834,077

[22] Filed: Apr. 14, 1997

[51] Int. Cl.$^6$ ............... C05C 9/00; C05C 7/00; C05B 15/00; C05B 7/00

[52] U.S. Cl. ............... 71/28; 71/29; 71/30; 71/34; 71/35; 71/58; 71/60; 71/64.07; 71/64.12; 428/403

[58] Field of Search ............... 71/64.12, 64.07, 71/28, 29, 30, 34, 35, 58, 60; 428/403

[56] References Cited

U.S. PATENT DOCUMENTS

| | | | |
|---|---|---|---|
| 1,266,212 | 5/1918 | Capron | 23/119 |
| 1,919,707 | 7/1933 | Adam et al. | |
| 2,043,067 | 6/1936 | Rumscheidt et al. | 23/119 |
| 2,092,073 | 9/1937 | Jeltsch et al. | 23/119 |
| 2,099,079 | 11/1937 | Rumscheidt et al. | 23/119 |
| 2,102,107 | 12/1937 | Berkhoff, Jr. | 23/119 |
| 2,178,082 | 10/1939 | Rayner | 23/119 |
| 2,226,101 | 12/1940 | Ogden | 23/119 |
| 2,228,742 | 1/1941 | Applebey | 23/119 |
| 2,368,901 | 2/1945 | Tiddy | 23/119 |
| 2,423,794 | 7/1947 | Otto | 23/119 |
| 2,424,207 | 7/1947 | Otto | 23/119 |
| 2,599,067 | 6/1952 | Otto | 23/119 |
| 2,631,084 | 3/1953 | Robinson | 23/119 |
| 2,659,659 | 11/1953 | Schmidl | 23/119 |
| 2,782,097 | 2/1957 | Costolow | 23/119 |
| 2,795,487 | 6/1957 | Otto | 23/273 |
| 2,805,125 | 9/1957 | Van Ackeren | 23/119 |
| 2,874,028 | 2/1959 | Ponchaud | 23/119 |
| 2,895,800 | 7/1959 | Otto | 23/119 |
| 3,186,828 | 6/1965 | Baarson et al. | 71/64 |
| 3,393,973 | 7/1968 | Almy | 23/89 |
| 3,598,563 | 8/1971 | Burch | 71/64.12 |
| 3,600,818 | 8/1971 | Lang | 34/10 |

(List continued on next page.)

FOREIGN PATENT DOCUMENTS

| | | |
|---|---|---|
| 980596 | 12/1975 | Canada. |
| 179538 | 7/1979 | Czechoslovakia. |
| 0255665 | 2/1988 | European Pat. Off.. |
| 0320987 | 6/1989 | European Pat. Off.. |
| 670299 | 9/1995 | European Pat. Off.. |
| 1578057 | 7/1969 | France. |
| 100735 | 10/1973 | Germany. |
| 2550122 | 5/1976 | Germany ............... 71/64.12 |
| 139709 | 1/1980 | Germany. |
| 218089 | 1/1985 | Germany. |
| 61-256917 | 11/1986 | Japan. |
| 62-46920 | 2/1987 | Japan. |
| 2019535 | 9/1994 | Russian Federation. |
| 919994 | 4/1982 | U.S.S.R.. |
| 1169966 | 7/1985 | U.S.S.R.. |
| 1381480 | 1/1975 | United Kingdom. |
| 9118059 | 11/1991 | WIPO. |

OTHER PUBLICATIONS

Parkash, "Residence Times of Crystals in a Fluidised Bed Crystallizer", *Chemistry and Industry,* pp. 919–920.

Parkash et al., "Crystal Growth in Fluidized Beds", *Indian Chemical Engineer,* Jan. 1968, pp. 3–6.

Vragov, "Investigation of Ammonium Sulfate Crystallization in a Pseudo Liquified Layer", *Sb. Nauch, Tr., Kuzbas, Politekh. Int.,* No. 26, 1970.

Postnikov et al., "Crytallization of Ammonium Sulfate in a Two–Circuit Device with a Circulating Suspension", *Koksii Khimiya,* No. 4, 1983, pp. 24–27.

Galoryl Ath 632 Product Bulletin, Lobeco Products Inc., (no date available).

*Primary Examiner*—Wayne Langel

[57] ABSTRACT

A substantially non-caking solid is treated with distillation bottoms that are liquid at about 60° C. or less and are obtained from production of an alcohol having the formula:

R2—R1—OH, wherein R1 is substituted or unsubstituted branched, straight chain or cyclic $C_4$ to $C_{12}$ and R2 is OH or H.

5 Claims, 4 Drawing Sheets

CAKE BREAKING FORCE VS. TREATMENT LEVEL

U.S. PATENT DOCUMENTS

| | | | |
|---|---|---|---|
| 3,794,099 | 2/1974 | Ganiaris | 159/48 R |
| 4,057,396 | 11/1977 | Matovich | 23/252 R |
| 4,141,316 | 2/1979 | Grun | 118/303 |
| 4,242,307 | 12/1980 | Fally | 117/204 |
| 4,277,253 | 7/1981 | Walter et al. | 23/313 R |
| 4,332,933 | 6/1982 | DiDrusco et al. | 422/139 |
| 4,435,341 | 3/1984 | Bechtold | 264/7 |
| 4,698,913 | 10/1987 | Voll | 34/10 |
| 4,715,555 | 12/1987 | Newman et al. | 423/268 |
| 4,741,807 | 5/1988 | Wilhelm et al. | 196/14.52 |
| 4,859,315 | 8/1989 | Bartholic | 208/153 |
| 5,032,143 | 7/1991 | Ritakallio | 23/313 |
| 5,041,153 | 8/1991 | Detroit | 71/25 |
| 5,075,138 | 12/1991 | Tanaka et al. | 427/213 |
| 5,120,345 | 6/1992 | Kayaert et al. | 71/30 |
| 5,330,544 | 7/1994 | Thomson et al. | 23/313 |
| 5,408,953 | 4/1995 | Thomson et al. | 117/206 |
| 5,431,708 | 7/1995 | Lehmann et al. | 71/28 |
| 5,454,851 | 10/1995 | Zlotnikov et al. | 71/64.07 |

ANTI-CAKING SOLIDS

FIELD OF THE INVENTION

The present invention relates generally to the solids handling industry with particular application to solid fertilizers that are provided with a reduced tendency to cake.

BACKGROUND OF THE INVENTION

Certain solids have a tendency to cake during storage and shipment. This problem is exemplified in the crop fertilizer field. Solid fertilizer materials are generally free-flowing granules that may be shipped in railcars or stored in large sheds. However, such materials can form firm cakes that can be broken only by severe impact. When caking occurs, the lumps or rocks that form cannot be easily handled by fertilizer spreading equipment. Fertilizer consumers often require a relative uniformly sized material. A wide range of particle size forms when caked fertilizer is broken-up, effecting product quality.

Caking in rail cars may result in the formation of a layer (possibly several inches thick) of the fertilizer against the rail car walls requiring additional labor and longer unloading times to empty the railcars. Also, caking in storage piles results in longer loading times. Additional labor and special equipment may be needed to break-up the stored pile.

Ammonium sulfate is an excellent example of a fertilizer that tends to cake on sitting or during shipment. While not wishing to be bound by any theory, one hypothesis involving the tendency of ammonium sulfate (and other water soluble fertilizers) to cake involves the daily temperature/humidity cycle. During the evening as the temperature cools, moisture from the atmosphere or "dew" condenses. The ammonium sulfate in contact with condensed moisture is partially dissolved and forms "bridges" between ammonium sulfate particles. During the day, the condensed moisture is evaporated by the heat from the sun. The "bridges" are dried and harden. Additionally, the problem is aggravated because ammonium sulfate and other bulk fertilizers are generally stored and shipped in containers which are not air-tight. Finally, if the ammonium sulfate is not completely dried by the production process, the residual moisture contributes to the caking problem in the same way as condensed "dew".

The manufacture of ammonium sulfate is the subject of a large body of patent literature. For example, processes for making ammonium sulfate are described in U.S. Pat. No. 2,226,101 to Ogden. Ogden describes the addition of creosote or other oily substances to the mother liquor to carry impurities in the crystals to the surface of the liquor for removal, thus improving the whiteness of the crystals.

Ammonium sulfate is known to cake on standing in bulk. Methods proposed to overcome this tendency include crystal size and morphology control. Exemplary such methods are described in U.S. Pat. No. 1,919,707 to Gordon et al., U.S. Pat. No. 2,228,742 to Applebey and U.S. Pat. No. 5,330,544 to Thomson et al.

Sprays have been applied to ammonium sulfate crystals obtained from the dry distillation of coal to deodorize them. For example, Japanese Kokai 62(1987)-46920 describes spraying such crystals with a pH 7–8, ammonium-rich saturated ammonium sulfate solution.

Ammonium sulfate has also been granulated to improve particle size distribution. U.S. Pat. No. 4,277,253 to Walter et al. describes the granulation of ammonium sulfate and other fertilizer ingredients.

It is known to apply organic materials to such fertilizer granules to inhibit the tendency of the materials to cake. U.S. Pat. No. 4,717,555 to Newman et al. describes naphthalene sulfonates and water applied to ammonium salts to prevent caking and dust formation. U.S. Pat. No. 5,041,153 to Detroit describes lignosulfonate treated inorganic fertilizer chemicals that resist caking and dust formation.

Russian Inventor's Certificate 2019535 C1 describes the use of glycerol residuum (bottoms formed in the distillation of crude glycerol) applied to potassium chloride as an anti-dusting agent.

Lobeco Products Inc. offers an anti-caking product under the name Galoryl™ ATH 632. Galoryl ATH 632 is a solid at ambient temperature and must be heated (to about 800° C.) to the liquid state before application. This adds to the handling difficulty and contributes to the safety precautions that must be in place to prevent burns from spillage of heated liquids. In addition to the difficulties in handling Galoryl and similar sprays, they are expensive and add significantly to the production cost of free-flowing granules. Therefore, a need remains for safely and economically producing granules that remain free-flowing even after storage and shipment.

SUMMARY OF THE INVENTION

Accordingly, it is an object of the present invention to provide granules like ammonium sulfate that are free-flowing even after storage and shipment.

It is a further object of the present invention to provide a process for making storage stable free flowing granules.

These and related objects and advantages are met in a substantially non-caking solid comprising an at least partially water soluble solid coated with certain distillation bottoms. The distillation bottoms are liquid at about 60° C. or less and are obtained from production of an alcohol having the formula:

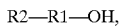

wherein R1 is substituted or unsubstituted branched, straight chain or cyclic $C_4$ to $C_{12}$ and R2 is OH or H.0. The preferred distillation are distillation bottoms from the production of hexanediol. The preferred solid is granular fertilizer selected from ammonium sulfate; ammonium nitrate; sodium nitrate; potassium nitrate; calcium nitrate; urea; diammonium phosphate; ammonium polyphosphate; monoammonium phosphate; triple superphosphate; ammonium chloride; potash; potassium chloride; potassium nitrate potassium chloride; and mixtures of these. The distillation bottoms are preferably applied at a rate of about 0.1 to about 20 lb./ton solid. The solid of the invention exhibits superior anti-caking properties, especially in the preferred granular fertilizer field.

Related objects and advantages will become apparent to those of ordinary skill in the art to which the invention pertains after reading the following detailed description of the invention.

DETAILED DESCRIPTION OF THE PREFERRED EMBODIMENTS

Figure 1:
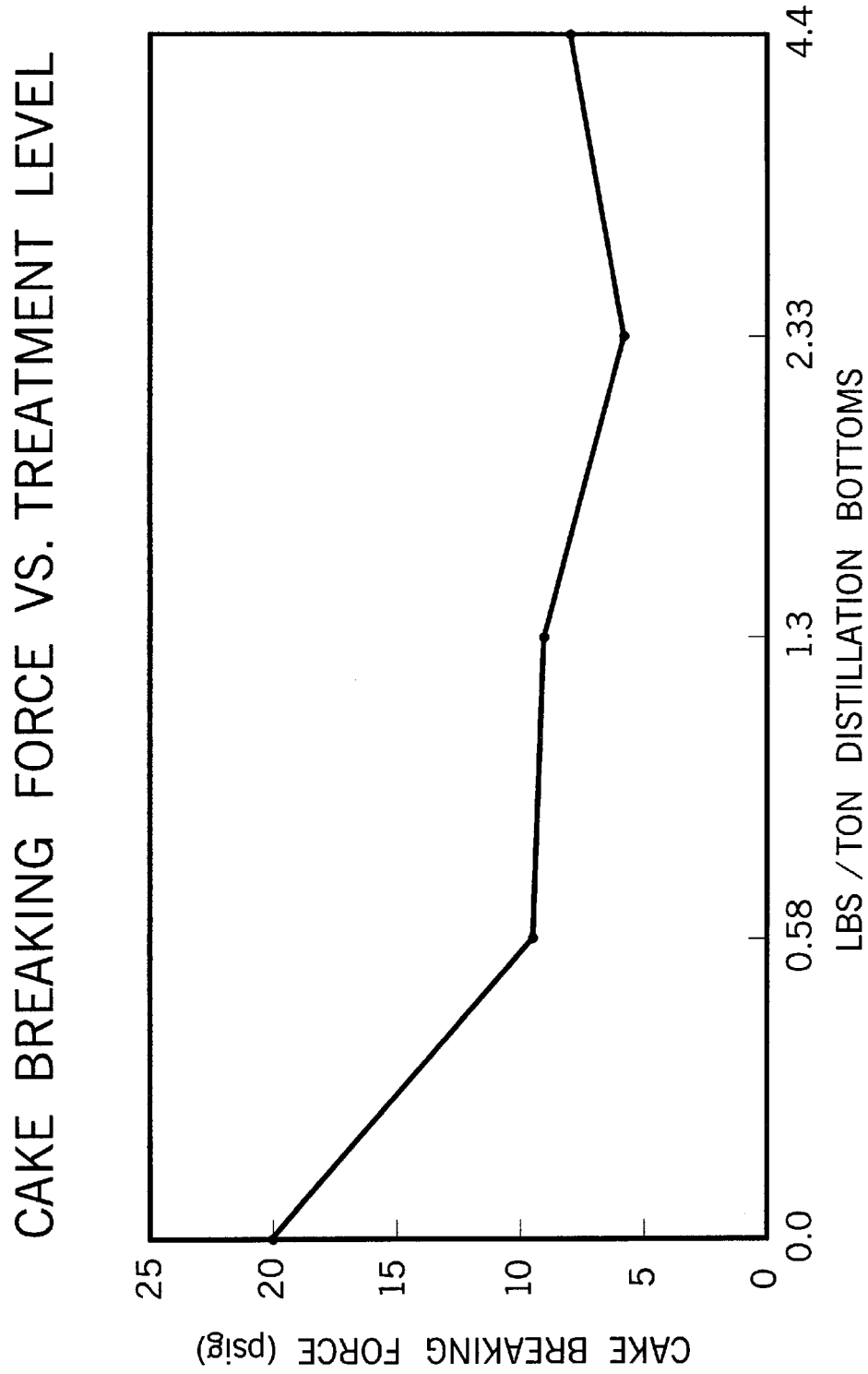
FIG. 1 is a graph showing the decrease in force necessary to break an ammonium sulfate cake treated according to the present invention.

The invention will now be described with reference to the Figures and specific language will be used to describe the same. No limitation should be inferred due to the specific language. Modifications, further embodiments and equivalents as envisioned by the ordinarily skilled in this art are considered within the scope of the present invention and its elements.

The solids handling industry uses different terms to describe solids. "Powder" generally defines a very fine or dust-like material. "Granules" refer to larger particles that have more mass. "Particulate" is another term that is used. Agriculturists want to apply granular materials because they spread uniformly. Lighter materials are more difficult to spread uniformly on fields, especially on windy days. During the solids handling process, however, breakage occurs and dust or fines are generated. It should be understood in reading the following detailed description of the present invention that the term "granules" is not used in any limiting sense and applies to granular materials as well as fines, powders, particulate, combinations of these, etc.

One aspect of the present invention is a process for hindering the tendency of solids to cake by applying distillation bottoms from the production of an alcohol having the formula:

R2—R1—OH, to the solid, wherein R1 is substituted or unsubstituted, branched, straight chain, or cyclic $C_4$ to $C_{12}$ and R2 is OH or H. Such distillation bottoms are in the liquid state at 60° C. or less. It is surprising that this by-product stream can be effectively used to prevent or significantly hinder the tendency of granules to cake on storage and shipment. Further, due to its low volatility of the materials in the stream, the evaporation rate is minimal, although it will be understood that some degree of evaporation will occur.

The useful distillation bottoms (sometimes called "distillation heavies") are the by-product of the production of alcohols according to the formula: R2—R1 OH, wherein R1 is substituted or unsubstituted, cyclic, branched or straight chain, $C_4$ to $C_{12}$ and R2 is OH or H. Preferably, the distillation bottoms are the by-product of the production of 1,6, hexanediol. While not wishing to be limited to the exact proportions of materials present in such bottoms, the following are exemplary components of 1,6 hexanediol distillation bottoms (in percent by weight by gas chromatography): 1,6 hexanediol (3.0–9.6), 6,6'dihydroxy-dihexyl ether (2.8–9.9), oligomers (11.5–14.0), various other diols, esters and ethers (73.6–76.8), and water (0.2–0.3). 1,6 hexanediol distillation bottoms is a dark liquid that freezes at about −540° C.

The present invention is applicable to a variety of granules that tend to cake, including any solid material that dissolves in water to a significant degree. Moreover, the present invention suppresses the formation of dust in solids that tend to produce dust. Such materials are found in many industries such as food, cosmetic, mining, sodium chloride, etc., industries. The reference to the fertilizer industry and fertilizer granules in this detailed description is, therefore, not considered to limit the present invention to the fertilizer industry. Exemplary granules include ammonium sulfate, ammonium nitrate, sodium nitrate, potassium nitrate, calcium nitrate, urea, diammonium phosphate, ammonium polyphosphate, monoammonium phosphate, triple superphosphate, urea, ammonium chloride, potash, potassium chloride, potassium nitrate, potassium chloride and mixtures of these with other granules and with each other. Preferably, the granules are fertilizer granules and most preferably ammonium sulfate and mixtures thereof.

The distillation bottoms may be applied by spraying directly on the granules or by other methods of application. Spraying is the currently preferred method. Spraying may be accomplished, for example, by pumping the anti-caking agent through a spray nozzle which directs the anti-caking agent on to the material to be treated. Various methods of pumping (i.e., types of pumps, use of a vapor pad to move the anti-caking liquid, etc.) can be used as well as various types of nozzles (distributors, mixing drums, etc.). Many types of conventional and novel equipment can be used for this application. The anti-caking agent should be applied in a uniform layer on the material to be treated. In some cases, the distillation bottoms may be heated before application but this is not essential. When heating is desired, the preferred heating temperature is from about 20° to about 60° C.

The rate of application will depend on the end use for which the solids are intended. In the case of fertilizers, the application rate is preferably in the range of about 1 pound to about 20 pounds per ton of granules. More preferably, the application rate is about 2 to about 6 pounds of distillation bottoms per ton of granules.

Another aspect of the present invention is a substantially non-caking solid treated with the distillation bottoms from the production of an alcohol having the formula:

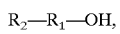

$R_2$—$R_1$—OH, wherein R1 is substituted or unsubstituted, branched, straight chain or cyclic $C_4$ to $C_{12}$ and $R_2$ is OH or H. Such distillation bottoms are in the liquid state at about 60° C. or less. The useful distillation bottoms are described in more detail above in connection with the process aspect of the present invention. The preferred heavies are from the production of 1,6 hexanediol as described previously.

The treated solid of the present invention may be any one of a variety of granules that tend to cake, including any material that dissolves in water to a significant degree. Such materials are found in many industries such as food, cosmetic, mining, sodium chloride, etc., industries. As noted in connection with the process of the present invention, the reference to the fertilizer industry and fertilizer granules in this detailed description is not considered to limit the present invention to the fertilizer industry. Exemplary granules include ammonium sulfate, ammonium nitrate, sodium nitrate, potassium nitrate, calcium nitrate, urea, diammonium phosphate, ammonium polyphosphate, monoammonium phosphate, triple superphosphate, urea, ammonium chloride, potash, potassium chloride, potassium nitrate, potassium chloride and mixtures of these with other granules and with each other. Preferably, the solid granules are fertilizer granules and most preferably ammonium sulfate and mixtures thereof.

To make the treated solid of the present invention, the distillation bottoms may be applied by spraying directly on the granules as described above in connection with the process. The distillation bottoms are present on the solid at about 0.1 to about 20 pounds per ton of the solid. Preferably, the distillation bottoms are present at about 2–6 lb. distillation bottoms for ton of the solid.

The invention will now be described in the following specific examples; however, no limitation on the scope of the invention should be inferred from the specific details of these examples.

EXAMPLE 1

Untreated Ammonium Sulfate

Untreated ammonium sulfate powder is placed in a test cell and a pressure of 2 metric tons per square inch is applied for 1 minute. The cake is removed from the test cell and is placed on a force gauge and broken. This procedure is repeated on seven different samples from the same production lot. The data from these seven trials is averaged. The average force needed to break these cakes is 22.6 lb. per square inch.

EXAMPLE 2

Untreated Ammonium Sulfate

Ammonium sulfate from a second production lot is subjected to the procedure of Example 1 except that the procedure is repeated three times instead of seven. The average force needed to break these cakes is 20.0 lb. per square inch.

EXAMPLES 3–6

Invention

Ammonium sulfate from the same production lot as Example 2 is sprayed with hexanediol bottoms using a plastic spray bottle. The spray bottle is weighed before and after spraying to determine how much hexanediol bottoms are applied. The spraying is accomplished by placing about 4000 g of untreated ammonium sulfate in a laboratory drum mixing apparatus. After spraying, the drum is mixed for several minutes. Samples from the drum mixing apparatus are used for cake breaking tests.

For Examples 3–6, the application rates are (in pounds per ton of ammonium sulfate) 0.58, 1.30, 2.33 and 4.4, respectively. The treated ammonium sulfate is subjected to the procedure described in Example 1 except that the procedure is repeated 3 times one for each application level, instead of seven. The average force (in pounds per square inch) needed to break the cakes of Examples 3–6 is 9.7, 9.3, 6.3 and 8.3, respectively. The data is presented graphically in FIG. 1 with data from Example 2 as a comparison. It is not believed that the differences in breaking strength among Examples 3–6 are significant.

EXAMPLES 7 & 8

Railcar Shipment

Invention

In Examples 7 and 8, ammonium sulfate is treated with 1,6 hexanediol distillation bottoms at the rate of 2.2 lb./ton and 5 lb./ton, respectively. The treated material is shipped about 60 miles and 300 miles, respectively, and then unloaded. In both cases, the ammonium sulfate is free flowing as it was unloaded from the railcar.

EXAMPLE 9

Application Test

Ammonium sulfate fertilizer is sprayed with HDO distillation bottoms at rate of about 4.2 lb./ton. Untreated ammonium sulfate fertilizer is obtained from BASF Corporation, Freeport, Tex. Both materials are ground prior to use. Lakeland fine sandy loam soil is collected from Brazos County, Texas, dried and ground to pass a 2 mm sieve prior to use.

Sixteen samples of the soil are separately amended with the treated and untreated fertilizers at a rate sufficient to generate a nitrogen level of 100 lb. N/ac. Thus, there are 32 samples of amended soil. The amended soil is thoroughly mixed and placed in an appropriately labeled specimen cup. One acre of soil six inches deep contains $2 \times 10^6$ lb. of soil. Unamended soil is used as a control. Sixteen control replicates are used.

All 48 samples are watered with 30 g of deionized water, and loosely covered with plastic wrap to limit evaporation. One set of eight replicates from each type of sample are allowed to stand for three days prior to planting. The other set of eight replicates per sample type are maintained at constant weight for soil analysis.

After 17 days, pots are paired up in replicates and analyzed for $NH_4$—N and $NO_3$—N to study the effects of the coating on solubility and nitrification of the soil. The results are summarized in Table 1.

TABLE 1

| | Nitrate and Ammonium Data | | |
|---|---|---|---|
| SAMPLE ID | REPLICATE | $NH_4$—N, ppm | $NO_3$—N, ppm |
| Untreated Fertilizer | 1 & 2 | 89.9 | 6.9 |
| Untreated Fertilizer | 3 & 4 | 89.2 | 7.2 |
| Untreated Fertilizer | 5 & 6 | 83.8 | 6.5 |
| Untreated Fertilizer | 7 & 8 | 83.8 | 7.2 |
| Treated Fertilizer | 1 & 2 | 86.4 | 7.2 |
| Treated Fertilizer | 3 & 4 | 88.6 | 8.6 |
| Treated Fertilizer | 5 & 6 | 89.8 | 7.1 |
| Treated Fertilizer | 7 & 8 | 92.0 | 5.5 |
| Control | 1 & 2 | 14.5 | 6.3 |
| Control | 3 & 4 | 12.4 | 7.2 |
| Control | 5 & 6 | 11.9 | 7.3 |
| Control | 7 & 8 | 12.1 | 6.8 |

Gulf ryegrass seed is from Bryan Producers Co-Op of Bryan, Tex. One gram of soil is removed from the surface of each specimen cup and 5 grams of gulf ryegrass seed is placed on the soil surface in each specimen cup. The removed soil is then replaced in the specimen cup to cover the seed. The newly planted seed is watered with 15 grams deionized water. The cups are loosely covered with plastic wrap to limit evaporation, and placed on a countertop out of direct sunlight. The pots are watered every day with 2 g of deionized water to maintain sufficient moisture for growth.

Figure 2:
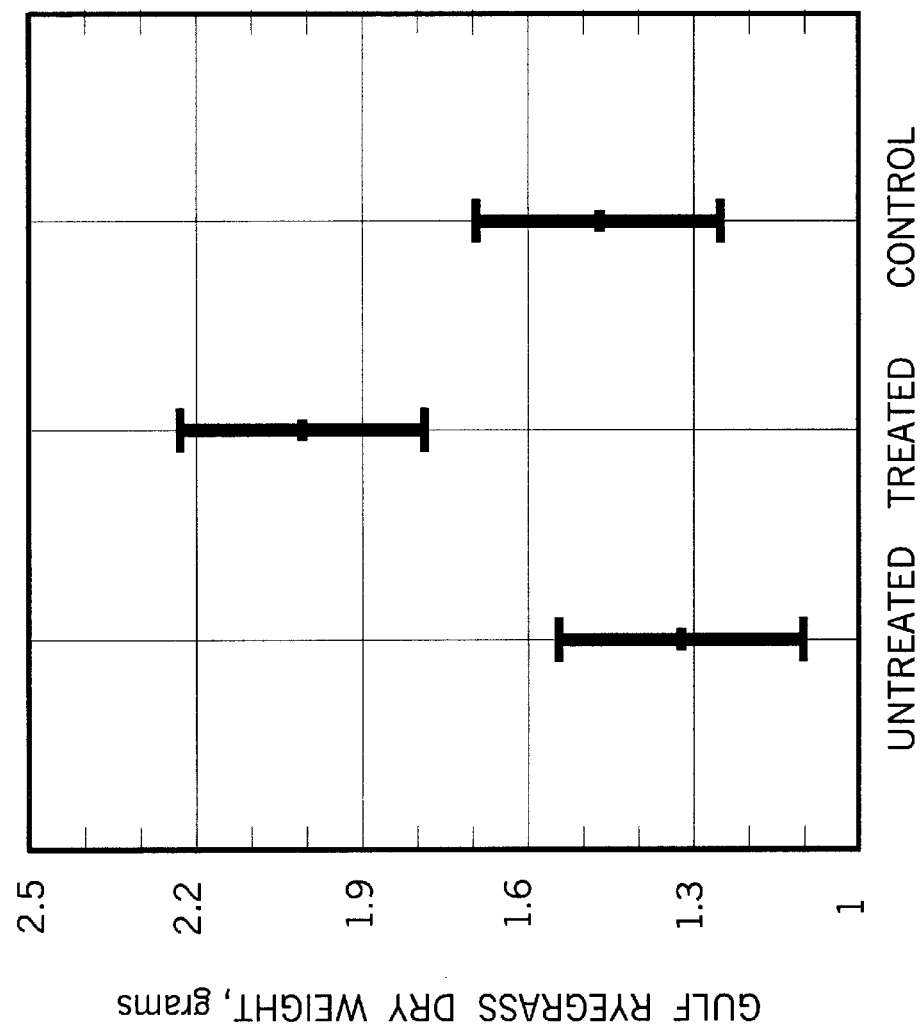
FIG. 2 is a graph demonstrating the agronomic performance of the present invention compared to a control and untreated ammonium sulfate.
Figure 3:
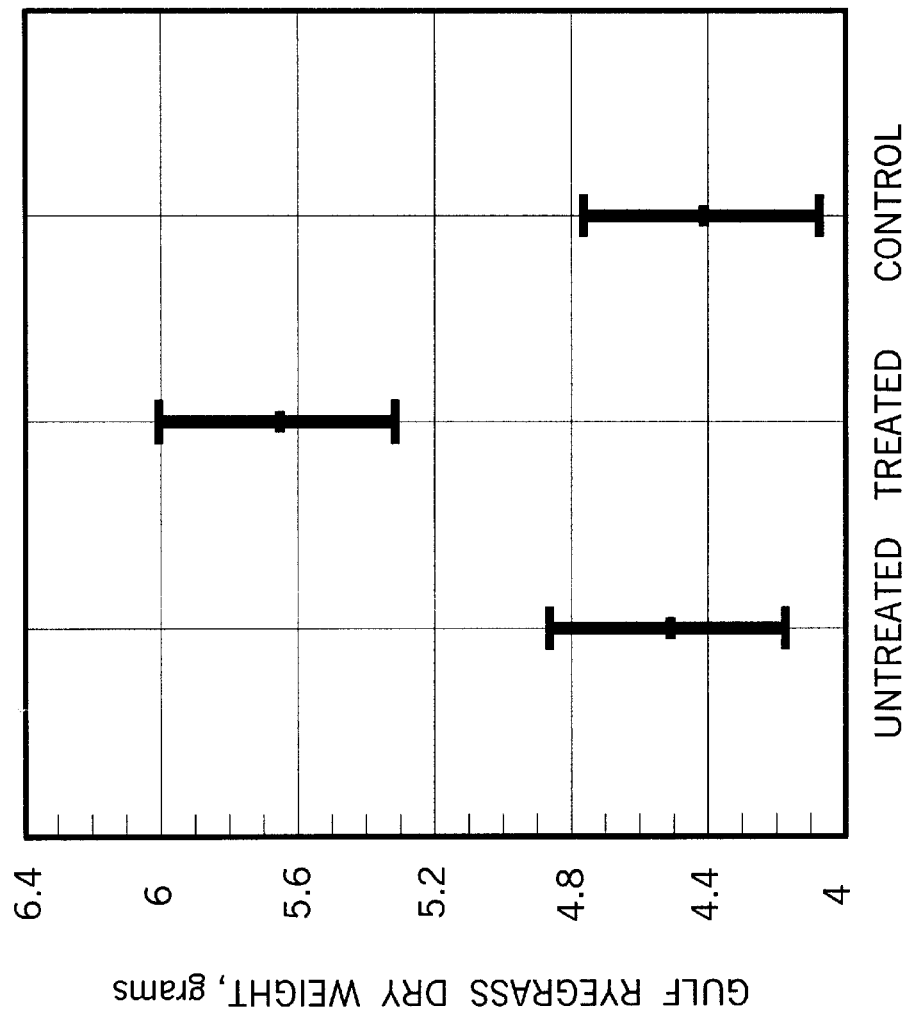
FIG. 3 is another graph demonstrating the agronomic performance of the present invention compared to a control and untreated ammonium sulfate.

Two days after germination, the pots are top dressed with an additional 100 lb. N/acre application of the appropriate fertilizer (or no fertilizer in the case of the control). Eight days after planting the seeds, each cup is harvested by inverting the cup and tapping on it to loosen the soil and then gently washing the soil from the grass roots. The total plant mass (wet and after drying 24 hours at 60° C.) was recorded for each cup to generate the data shown in Table 2. The statistical average is presented in graphical form in FIGS. 2 and 3. FIG. 2 presents the dry weight results and FIG. 3 presents the wet weight results.

TABLE 2

| SAMPLE | REPLICATE | Wet Weight, g | Dry Weight, g |
|---|---|---|---|
| Untreated Fertilizer | 1 | 3.9769 | 1.3471 |
| Untreated Fertilizer | 2 | 4.0563 | 1.2972 |
| Untreated Fertilizer | 3 | 5.3218 | 1.5232 |
| Untreated Fertilizer | 4 | 4.4187 | 1.3860 |
| Untreated Fertilizer | 5 | 5.0400 | 1.2996 |
| Untreated Fertilizer | 6 | 4.2079 | 0.9570 |
| Untreated Fertilizer | 7 | 4.7284 | 1.2431 |
| Untreated Fertilizer | 8 | 4.6831 | 1.5957 |
| Treated Fertilizer | 1 | 5.9776 | 2.5313 |
| Treated Fertilizer | 2 | 5.4888 | 1.8736 |
| Treated Fertilizer | 3 | 6.3494 | 2.0070 |
| Treated Fertilizer | 4 | 5.6730 | 1.8941 |

TABLE 2-continued

| SAMPLE | REPLICATE | Wet Weight, g | Dry Weight, g |
|---|---|---|---|
| Treated Fertilizer | 5 | 5.3700 | 2.4436 |
| Treated Fertilizer | 6 | 6.0328 | 1.8081 |
| Treated Fertilizer | 7 | 5.4511 | 1.7013 |
| Treated Fertilizer | 8 | 4.7660 | 1.6946 |
| Control | 1 | 3.9366 | 1.3914 |
| Control | 2 | 3.8820 | 0.9159 |
| Control | 3 | 4.3373 | 1.3310 |
| Control | 4 | 5.9090 | 2.2145 |
| Control | 5 | 3.5726 | 0.9385 |
| Control | 6 | 3.3092 | 1.0550 |
| Control | 7 | 5.8045 | 2.5951 |
| Control | 8 | 4.2460 | 1.6026 |

EXAMPLES 10–12

Comparative Anti-Caking Agents

Figure 4:
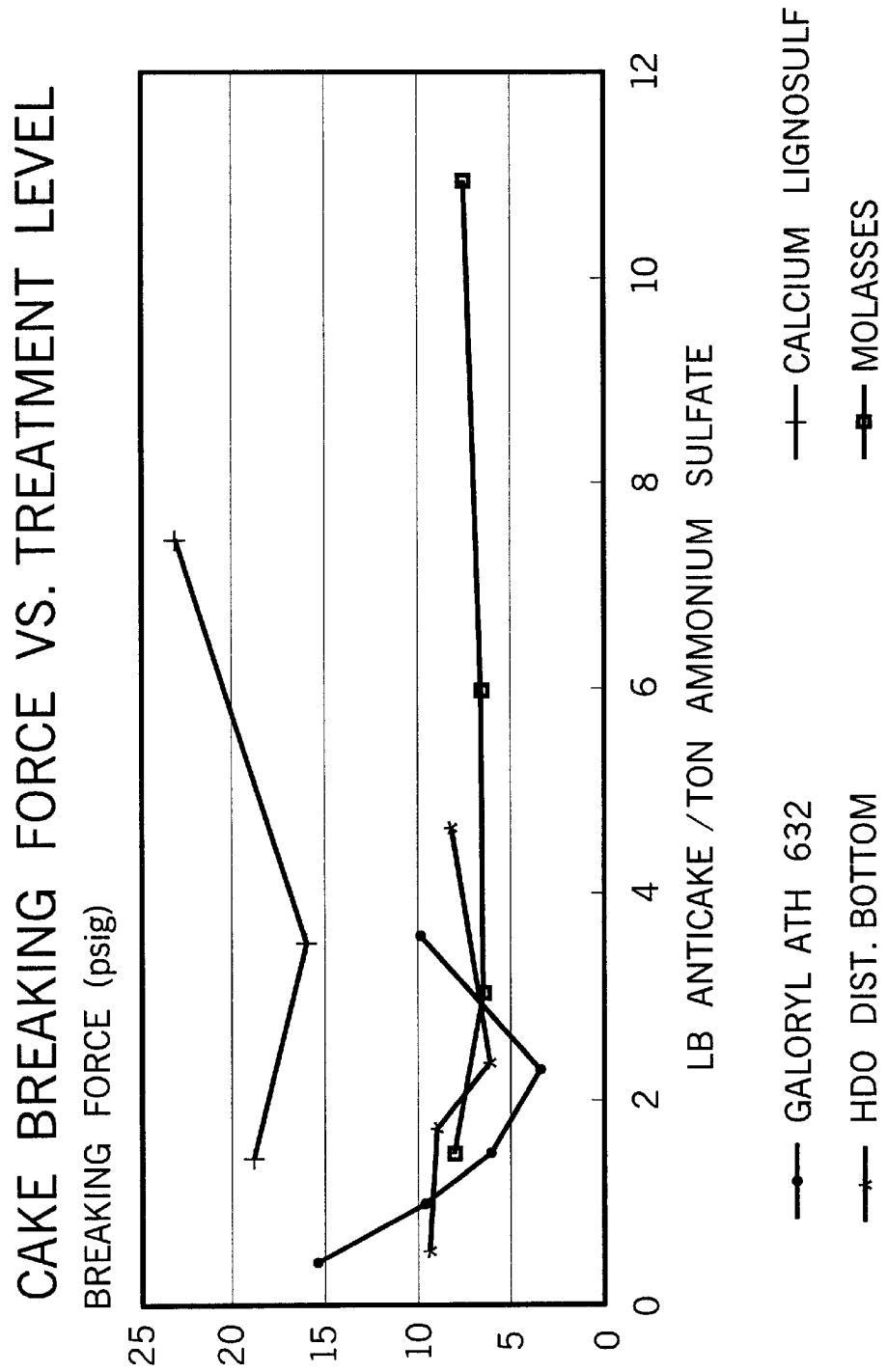
FIG. 4 is a graph comparing the anti-caking performance of the invention to prior art anti-caking agents.

The procedure of Example 3 is followed using three prior art anti-caking agents for comparison. The agents and the conditions used for each Example are presented in the Table below. The agents are applied to ammonium sulfate cakes at the rates indicated and the breaking strength measured. The results are presented in tabular form in Table 3 below and graphically compared to the anti-caking agent of the invention in FIG. 4.

TABLE 3

| Example | Agent | Application Rate (lb./ton) | Breaking Force (lb.) |
|---|---|---|---|
| 3–6 | invention | 0.58 | 9.7 |
|  |  | 1.30 | 9.3 |
|  |  | 2.33 | 6.3 |
|  |  | 4.4 | 8.3 |
| 10 | molasses | 1.23 | 8.3 |
|  |  | 2.84 | 6.6 |
|  |  | 6.06 | 6.6 |
|  |  | 0 | 14.3 |
|  |  | 10.98 | 7.3 |
| 11 | Galoryl | 0.34 | 15.2 |
|  |  | 0.80 | 9.6 |
|  |  | 1.27 | 6.4 |
|  |  | 2.05 | 3.4 |
|  |  | 3.48 | 10. |

TABLE 3-continued

| Example | Agent | Application Rate (lb./ton) | Breaking Force (lb.) |
|---|---|---|---|
| 12 | calcium lignosulfonate | 1.37 | 19 |
|  |  | 3.28 | 16 |
|  |  | 7.25 | 23 |

What is claimed:

1. A substantially non-caking solid comprising:

an at least partially water soluble solid coated with distillation bottoms, which bottoms are liquid at about 60° C. or less and are obtained from the distillation of hexanediol.

2. The solid of claim 1 wherein said solid is selected from the group consisting of:

ammonium sulfate;
ammonium nitrate;
sodium nitrate;
potassium nitrate;
calcium nitrate;
urea;
diammonium phosphate;
ammonium polyphosphate;
monoammonium phosphate;
triple superphosphate;
ammonium chloride;
potash;
potassium chloride;
potassium nitrate
potassium chloride; and
mixtures of these.

3. The solid of claim 2 wherein said solid is ammonium sulfate granules or a mixture thereof.

4. The solid of claim 1 wherein said distillation bottoms are present at the rate of about 0.1 to about 20 lb./ton solid.

5. The solid of claim 4 wherein said distillation bottoms are present at about 2 to about 6 lb./ton solids.

* * * * *